United States Patent
Wang et al.

(10) Patent No.: US 9,169,962 B2
(45) Date of Patent: Oct. 27, 2015

(54) MULTI-LINKAGE CLIP FOR CAMERA AND OTHER DEVICES

(75) Inventors: Stone Wang, TaiChung (TW); Jump Lin, TaiChung (TW); Martin Wang, Hsinchu (TW); Kenneth Ling, San Francisco, CA (US)

(73) Assignee: Logitech Europe S.A., Lausanne (CH)

( * ) Notice: Subject to any disclaimer, the term of this patent is extended or adjusted under 35 U.S.C. 154(b) by 404 days.

(21) Appl. No.: 13/216,726

(22) Filed: Aug. 24, 2011

(65) Prior Publication Data

US 2013/0048817 A1 Feb. 28, 2013

(51) Int. Cl.
*G03B 17/00* (2006.01)
*F16M 11/38* (2006.01)
*F16M 13/00* (2006.01)
*F16M 11/14* (2006.01)
*F16M 13/02* (2006.01)

(52) U.S. Cl.
CPC ............ *F16M 11/14* (2013.01); *F16M 13/022* (2013.01); *G03B 17/00* (2013.01); *Y10T 29/49826* (2015.01)

(58) Field of Classification Search
CPC ........ G06F 1/607; F16M 13/02; F16M 11/10; F16M 11/14; F16M 11/2014; G03B 17/002
USPC ............. 248/286.1, 284.1, 126, 166, 229.13, 248/187.1, 309.1, 918, 121, 226.11, 231.51, 248/316.5, 316.7; 348/373, 375, 376; 396/428, 419; 361/679.55, 679.59
See application file for complete search history.

(56) References Cited

U.S. PATENT DOCUMENTS

| | | | |
|---|---|---|---|
| 5,855,343 A * | 1/1999 | Krekelberg | 248/121 |
| 6,418,010 B1 * | 7/2002 | Sawyer | 361/679.05 |
| 6,738,094 B1 * | 5/2004 | Minami et al. | 348/373 |
| 7,066,664 B1 * | 6/2006 | Sitoh et al. | 396/428 |
| D554,682 S | 11/2007 | Martinez et al. | |
| D563,446 S | 3/2008 | Stephens et al. | |
| D564,559 S | 3/2008 | Stephens et al. | |
| 7,431,253 B2 * | 10/2008 | Yeh | 248/286.1 |
| D579,967 S | 11/2008 | Jones et al. | |
| 7,572,073 B2 * | 8/2009 | Kenoyer et al. | 396/428 |
| 7,618,202 B2 * | 11/2009 | Xiao et al. | 396/428 |
| 7,775,486 B2 * | 8/2010 | Depay et al. | 248/126 |
| 7,931,243 B2 * | 4/2011 | Yim et al. | 248/229.13 |
| 2007/0212057 A1 * | 9/2007 | Liang | 396/428 |
| 2011/0243548 A1 * | 10/2011 | Khamsepoor et al. | 396/428 |

* cited by examiner

*Primary Examiner* — Tan Le
(74) *Attorney, Agent, or Firm* — Kilpatrick Townsend & Stockton LLP (57) ABSTRACT

Systems and methods related to computer peripheral devices and mounts are described including device mounts with three linkages. A first linkage may include a body, an abutment piece approximately perpendicular to the body, and a device attachment mechanism disposed proximate to said abutment piece. A second linkage is rotatably connected to the first linkage and a third linkage is rotatably connected to the second linkage. The third linkage may at least partially overlaps the second linkage and extend beyond an end of the second linkage. A camera housing may also be attached to the first linkage, e.g. by a hinge or socket joint. The second linkage may be connected to the first linkage via a friction hinge, and the third linkage may be connected to the second linkage via another friction hinge. The third linkage may preferably include a substantially planar contact surface with a chamfered leading edge.

21 Claims, 10 Drawing Sheets

MULTI-LINKAGE CLIP FOR CAMERA AND OTHER DEVICES

BACKGROUND OF THE INVENTION

The present invention generally relates to peripheral devices for computers. More particularly, the present invention relates to a clip for use with a sensor, such as an image capturing device, or the like, and methods of manufacturing and using such clips.

An example of a sensor that is typically attached to another device is a webcam. A webcam is a peripheral device configured to be used with a computer, set-top box, etc., to capture light from a scene and generate a still images and/or a video stream from the captured light. Webcams are also often configured to capture audio and generate an audio-visual (AV) stream from the captured video and audio. The video stream and/or the AV stream are transferred from the webcam to a computer. The computer typically receives the video stream and/or the AV stream from the webcam for transmission across a network for viewing on a remote computer. The computer might also store the video stream and/or the AV stream for future access and viewing. The generated video stream and/or AV stream may be used for a video telephone call or a video conference on the Internet.

Various webcams have been designed to meet a variety of purposes, such as the webcams described in U.S. Design Pat. Nos. D579,967 issued Nov. 4, 2008, D564,559 issued Mar. 18, 2008, D563,446 issued Mar. 4, 2008 and D554,682 issued Nov. 6, 2007, each of which is assigned to the assignee of the instant application. U.S. Design Pat. No. D/595,328 assigned to Microsoft Corp. shows a webcam having a base for desktop use but not for placement on a computer monitor. While a variety of webcams are currently on the market, businesses continue to strive to provide users with new webcams that have new features, which improve the comfortable and efficient use of the webcams. In particular, there is need for an image capturing device that can readily and securely be applied to a wide variety of computer monitors and displays, including newer monitors and laptop displays having a very narrow panel depth, e.g. 5 mm or less.

BRIEF SUMMARY OF THE INVENTION

The present invention generally relates to peripheral devices for computers. More particularly, the present invention relates to a clip for use with peripheral devices such as sensors, image capturing devices, or the like, and methods of manufacturing and using such clips.

According to one embodiment of the present invention a device mount may include one or more of a first linkage including a body, an abutment piece approximately perpendicular to the body, and a device attachment mechanism disposed proximate to said abutment piece; a second linkage rotatably connected to the first linkage; and/or a third linkage rotatably connected to the second linkage. In embodiments, the third linkage may at least partially overlap the second linkage and/or may extend beyond an end of the second linkage.

In embodiments, the second linkage may be rotatably connected to the first linkage via a friction hinge, and/or the third linkage may be rotatably connected to the second linkage via another friction hinge. In embodiments, the third linkage may include a substantially planar contact surface and/or a chamfered leading edge.

In embodiments, the third linkage may include a trailing edge opposite the leading edge; the friction hinge may have an axis of rotation substantially parallel to the leading edge; and/or the leading edge may be closer to the axis of rotation than the trailing edge.

In embodiments, the device attachment mechanism may include a hinge, such as an axial hinge, or a joint mechanism, such as a ball and/or socket joint. Either of the hinge or the joint mechanism may be disposed forward of the trailing edge of the third linkage in a fully closed configuration. Either of the hinge or the joint mechanism may be disposed above, or approximately above, the abutment piece. As used herein, unless otherwise specified, "approximately above the abutment piece" may include locations slightly forward of the abutment piece and locations rearward of the abutment piece but forward of a trailing edge of the third linkage, e.g. in a fully closed configuration.

In embodiments, a device mount may also include an attached sensor housing configured to hold therein a sensor, such as a camera, a microphone, etc. The housing may include a housing attachment mechanism disposed within the housing. The housing attachment mechanism may be, for example, above a bottom surface of the housing, and/or forward of a rear surface of the housing. The housing attachment mechanism may be complimentary to the device attachment mechanism, e.g. a socket, a ball, a mating hinge and/or pin etc.

In embodiments, the housing attachment mechanism may include, for example, an axial hinge, a socket joint, or a ball joint, any of which may be disposed approximately above the abutment piece.

In embodiments, a device mount may also include a sensor, such as a camera, a microphone, etc., disposed in the housing. In embodiments, a center of gravity of the combined sensor and housing may be above, approximately above, or forward of the abutment piece.

In embodiments, the first linkage may have an overall length of approximately 40-50 mm, approximately 50-60 mm, approximately 60-75 mm, or in a range of approximately 40 mm-100 mm.

In embodiments, the second linkage is configured to rotate in excess of 90 degrees, in excess of 135 degrees, or in excess of 170 degrees.

In embodiments, the second linkage includes a counterweight, which may have a weight, for example, in a range of approximately 30-60 g, or 40-50 g.

According to further aspects of the invention, a method of manufacturing a device mount may include one or more steps of providing a first linkage including a body, an abutment piece approximately perpendicular to the body, and a device attachment mechanism disposed proximate to the abutment piece; providing a second linkage rotatably connected via a friction hinge to the first linkage; providing a third linkage rotatably connected via a friction hinge to the second linkage; and/or providing a leading edge of the third linkage with a chamfered edge. In embodiments, the third linkage may be disposed at least partially overlaping the second linkage and extending beyond an end of the second linkage.

Additional methods of manufacturing device mounts including steps for providing features otherwise described herein may also be included, as will be appreciated by those of skill in the art upon further understating of the present disclosure.

According to further aspects of the invention, a method of attaching a device mount as described herein to a panel display may include one or more steps of partially opening the first linkage and the second linkage via a friction hinge; placing the abutment piece in contact with a front surface of the display; partially closing the first linkage and second linkage via the friction hinge such that a chamfered leading edge of the third linkage contacts a back surface of the display, and forces a rotation of the third linkage about another friction hinge from a closed position to an open position engaged with the back surface of the display.

Additional methods of attaching device mounts including steps related to features otherwise described herein may also be included, as will be appreciated by those of skill in the art upon further understating of the present disclosure.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. For example, although certain embodiments including webcams and associated mounting devices may be described for convenience, the invention may include similar device mounts without limitation to webcams or other specifically described sensors. It also is to be noted that as used herein and in the appended claims, the singular forms "a," "an," and "the" include the plural reference unless the context clearly dictates otherwise. Thus, for example, a reference to "a hinge" is a reference to one or more hinges and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The present invention generally provides systems and methods for mounts that may be used with computer peripherals, or other sensor devices such as digital cameras etc., and may include, for example, a video camera mount and methods of manufacturing and using such mounts.

Image capturing devices, such as webcams, cameras, etc., are well known peripheral devices configured for capturing light from a scene and generating video and/or still images from the captured light. For convenience, image capturing devices may be referred to herein as webcams or cameras. Webcams may also often be configured to capture both audio and light from a scene for the generation of an audio-visual stream. It will be understood that use of the term "webcam" in the detailed description does not limit the claims. Likewise, various embodiments of the invention may be described as "camera mounts" irrespective of whether a camera is included in the device or not. Unless otherwise specified, the use of the term "camera mount" should not be interpreted as excluding cameras from the device in question.

Camera mounts for webcams and the like may be used in a variety of ways, and may be configured to stand on flat surfaces, mount to CRT and/or flat panel displays, etc. According to aspects of the invention, exemplary camera mounts may be particularly effective in mounting webcams and the like to extremely thin flat panel displays, as are becoming more prevalent.

Figure 1:
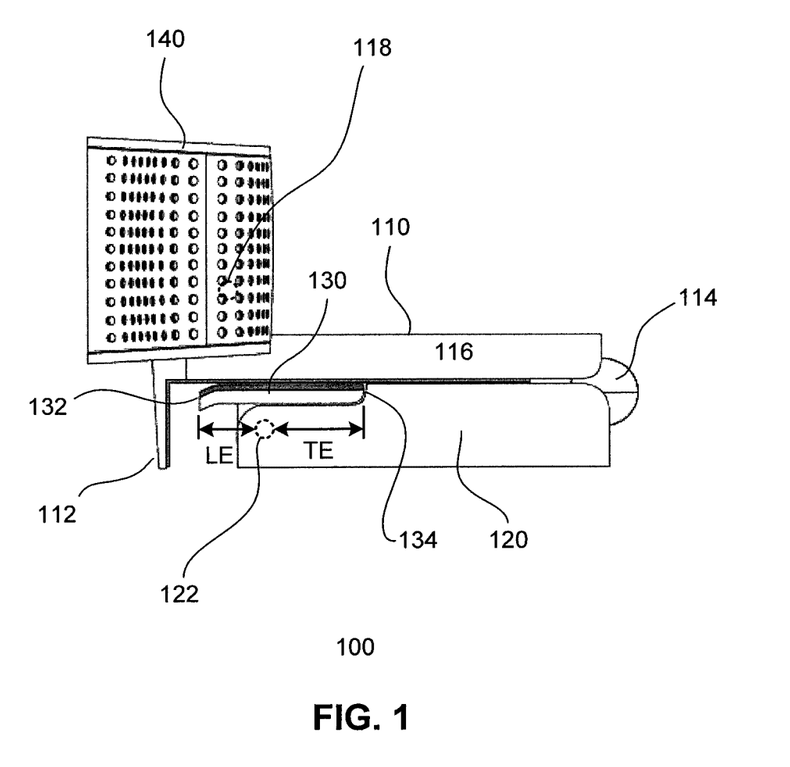
FIG. 1 is a side view of an exemplary webcam according to one embodiment of the invention.

FIG. 1 is a side view of an exemplary camera mount, according to first aspects of the invention, in a fully closed configuration. As described herein, in embodiments, exemplary camera mounts may be considered to be in a "fully closed" configuration, for example, when all of the associate linkages are substantially shut. As shown in FIG. 1, a webcam 100 may include a first linkage 110, a second linkage 120 and a third linkage 130. First linkage 110 may include an abutment piece, such as lip 112, and a hinge, such as friction hinge 114.

The first linkage 110 may have an overall length of, for example, approximately 40-50 mm, approximately 50-60 mm, approximately 60-75 mm, or in a range of approximately 40 mm-100 mm. In this regard, the inventors have found that, according to configuration with features as described herein, a length of at least 45 mm is desirable in order to operate on desktop monitors between 17 mm and 70 mm, although other dimensions are also contemplated.

Lip 112 may be disposed approximately perpendicular to the main body 116 of first linkage 110. A camera attachment mechanism with a rotational axis or pivot point at dashed circle 118, may be disposed above and slightly to the rear of the lip 112 to attach camera housing 140 to the first linkage 110. As described further herein, camera attachment mechanisms may take various forms, e.g. hinges, ball joints, etc., and may allow the camera housing 140 to move about one or more axes of rotation with respect to the first linkage 110. As used herein, a "front" or "forward" part of the device may be understood as toward the camera end of the device, and a "rear" or "rearward" part of the device may be understood as toward the hinge joining the first and second linkages. Thus, lip 112 is disposed at the front of the webcam 100, and friction hinge 114 is disposed at the rear of the webcam 100.

Housing 140 may include therein a variety of related components known to those of skill in the art. For example, housing 140 may include a digital camera (not shown), and/or various hardware modules and the like for collecting light and/or audio from a scene and converting the collected light and/or audio into still images or a video stream or an AV stream, which is transferred to a computer, a set-top-box or the like.

Second linkage 120 may be rotatably attached to the first linkage 110 via friction hinge 114. The webcam 100 may be configured such that, when the first linkage 110 and the second linkage 120 are in a closed configuration, the facing surfaces are substantially aligned or touching. Second linkage 120 may include another hinge, such as integral friction hinge 122, shown in dashed line, for rotatably attaching the third linkage 130 to the second linkage 120.

The third linkage 130 is likewise rotatably attached to the second linkage 120, and may rotate about the axis of hinge 122. The third linkage 130 may be considered to be closed when aligned as shown in FIG. 1.

As described herein, the first linkage 110, second linkage 120 and third linkage 130 may each include "top" and "bottom" surfaces considering the closed configuration shown in FIG. 1. That is, for example, a "bottom surface" of first linkage 110 faces a "top surface" of second linkage 120 and third linkage 130, and a "bottom surface" of third linkage 130 faces the "top surface" of second linkage 120. The bottom surface of first linkage 110, top surface of third linkage 130 and/or the interior surface of lip 112 may include coatings, or other materials, such as in the shaded areas shown in FIG. 1, for example, to improve the adhesion of the webcam 100 to a display.

The third linkage 130 has a substantially planar top surface including a chamfered leading edge 132 opposite the trailing edge 134. As discussed herein, a "chamfer" includes a beveled edge connecting two surfaces. Leading edges of the third linkage may also include a downward bend, as shown in FIG. 1, and/or multiple chamfers around various sides of the leading edge. The third linkage 130 partially overlaps the second linkage 102 in the area TE, and also extends beyond the end of the second linkage 120 in the area LE. As discussed further herein, such features may be advantageous, for example, in attaching the webcam 100 to a thin panel display. Also, in the case of monitor displays with largely flat back surfaces, the inventors have found, after numerous rounds of usability studies, that having a substantially planar contact surface on the third linkage may be advantageous in maximizing the contact area between the third linkage and the back of a display. For example, the inventors have found that a substantially planar contact surface on the third linkage enables the camera mount to provide an improved "grip" securely to the display, particularly for thin flat panel displays. The webcam 100 may be configured such that, when the second linkage 120 and the third linkage 130 are in a closed configuration, the top surfaces of each are substantially coplanar.

Figure 2:
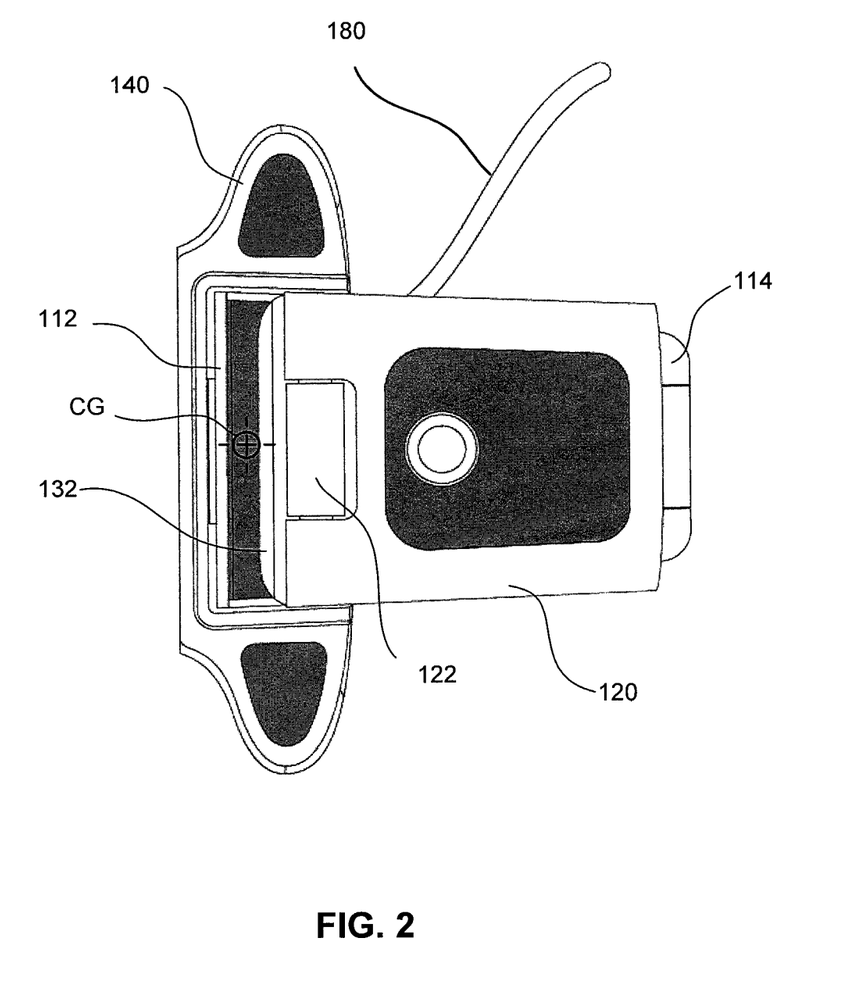
FIG. 2 is a bottom view of the exemplary webcam shown in FIG. 1.

FIG. 2 is a bottom view of the webcam 100 also in a closed configuration. As shown in FIG. 2, the second linkage 120 may include the friction hinge 122 disposed approximately under the camera housing 140. A center of gravity (CG) of the camera housing 140, and internal devices, is shown approximately over the lip 112, and in front of the leading edge 132. In embodiments, the CG of the camera housing and camera may be forward of the trailing edge of the third linkage 130, forward of hinge 122, or forward of lip 112. In embodiments, a counterweight may be provided in, or on, second linkage 120, e.g. a weight in a range of 40-50 g, or 45 g, attached to a bottom surface of the second linkage 120. A location and/or weight of a counter weight provided in the second linkage may vary according to, for example, the weight of the camera and the location of the camera with respect to the hinge point where the camera is connected to the first linkage.

The axis of friction hinge 122 is substantially parallel to leading edge 132, and trailing edge 134. As can be seen in FIG. 1 the leading edge 132 is closer to the axis of rotation of hinge 122 than the trailing edge 134. That is, distance LE shown in FIG. 1 is less than distance TE.

Returning to FIG. 2, webcam 100 may also include an output cable 180, depending on the output mode of the integrated camera. Images, video, and/or audio may be output from the webcam wirelessly in alternative embodiments. Webcam 100 includes a set of standard modules for collecting light and/or audio from a scene and converting the collected light and/or audio into still images or a video stream or an AV stream, which is transferred to a computer, a set-top-box or the like.

Figure 3:
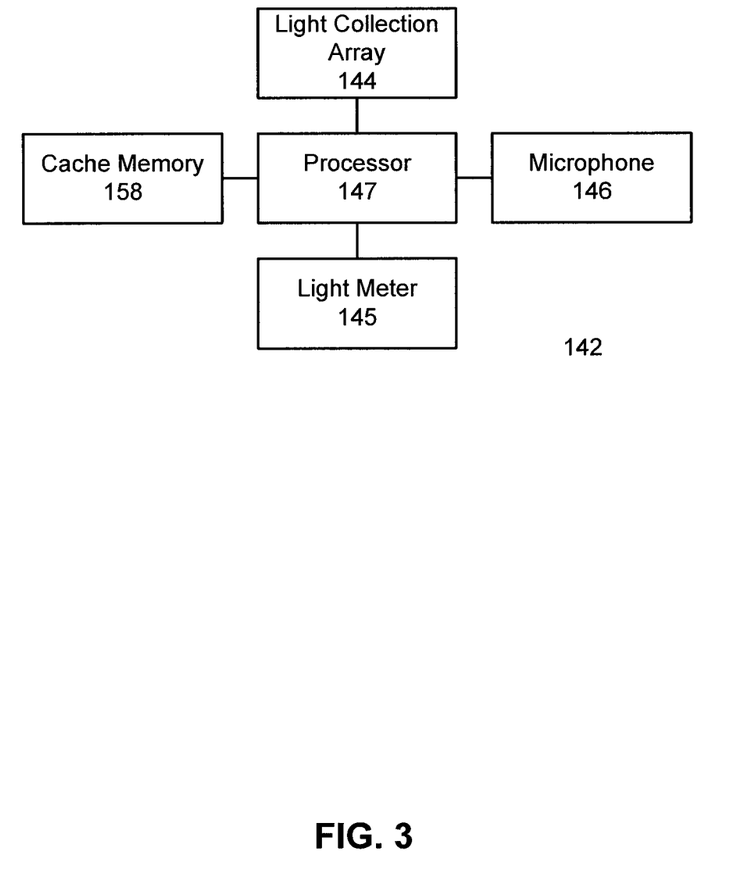
FIG. 3 is a simplified block diagram of a circuit, which may be included in the webcam shown in FIG. 1.

FIG. 3 is a simplified block diagram of a circuit 142, which may be included in webcam 100, e.g. within the camera housing 140. Circuit 142 may include various standard modules, such as a light collection array 144 (e.g., a CCD array, a CMOS array, etc.), a light meter 145, a microphone 146, a processor 147, a cache memory 148, and the like. The various standard modules included in circuit 142 may be included in a set of standard modules, which may include various other standard modules that are not circuits, such as a set of lenses for focusing collected light onto the light collection array. Some of the standard modules mentioned herein may not be included in webcam 100, while other modules not mentioned herein might be included in the webcam. All of these electronic modules are well known in the art and are not described in detail herein. Camera housing 140 may enclose these and/or or similar modules. The generated still images, video stream, and/or audio stream may be output from circuit 142 through output cable 180 or the like.

In embodiments, the camera attachment mechanism may include an axial hinge, or a joint mechanisms that enable pan and tilt, such as a ball and socket joint. Either of the axial hinge or joint mechanism may be disposed forward of the trailing edge of the third linkage in a fully closed configuration. Either of the axial hinge or joint mechanism may be disposed above, or approximately above, the abutment piece. As used herein, unless otherwise specified, "approximately above the abutment piece" may include locations slightly forward of the abutment piece and locations rearward of the abutment piece but forward of a trailing edge or hinge of the third linkage, e.g. in a fully closed configuration.

Figure 4:
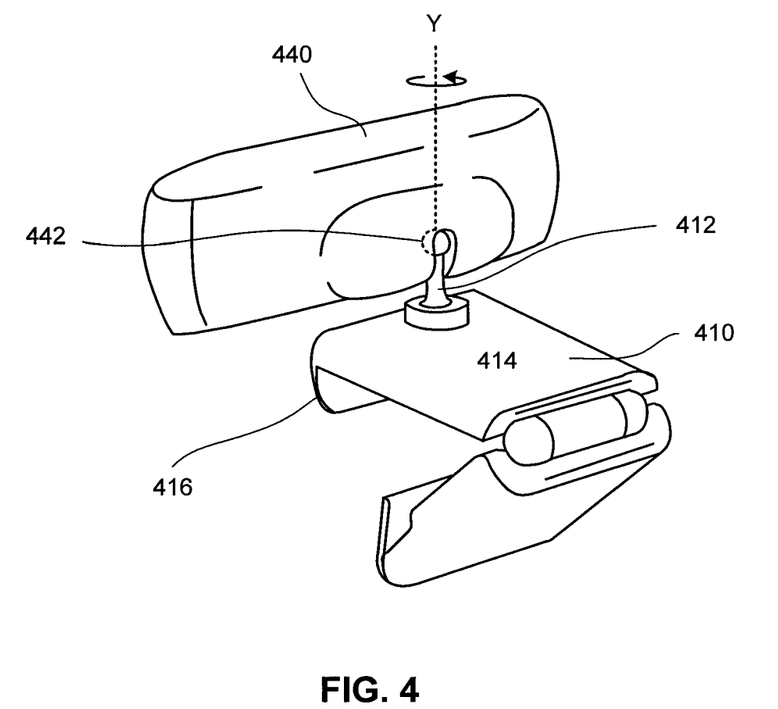
FIG. 4 is a simplified isometric view of an alternative embodiment of a webcam according to further aspects of the invention.

In embodiments, the housing attachment mechanism may include, for example, an axial hinge, joint mechanism, socket joint or ball joint, any of which may be disposed approximately above the abutment piece. An example of a housing attachment mechanism including a ball and socket joint is shown in FIG. 4. As shown in FIG. 4, a first linkage 410 includes a ball joint post 412 mounted to a front of the main body 414, and approximately over a front lip 416. Camera housing 440 includes a recessed socket joint 442, forward of a rear surface of the housing and over the bottom surface of the housing. Thus, housing 440 is capable of rotating about the ball joint post 412.

According to one embodiment, camera housing 440 has a horizontal length "L" that is greater than a vertical height "H". According to one embodiment, camera housing 440 is rotationally coupled to first linkage 414. Camera housing 440 may be configured to rotate about an axis "Y" that passes vertically through the camera housing. Camera housing 440 may be coupled to first linkage 410 according to a variety of mounting devices. In the embodiment shown in FIG. 4, first linkage 410 supports the ball socket pin 412, and the camera housing 440 includes the recessed socket joint 442. However, this arrangement could be reversed, or otherwise modified. For example, ball socket pin 412 could be disposed elsewhere on first linkage 410, and/or in a different orientation such as angled, or directly forward. In one embodiment, camera housing 440 may be configured to rotate at least 180° with respect to first linkage 410. In one embodiment, camera housing 440 may be configured to rotate up to 360° with respect to first linkage 410. In one embodiment, camera housing 105 is configured to rotate beyond 360° with respect to the first linkage 410.

Figure 5:
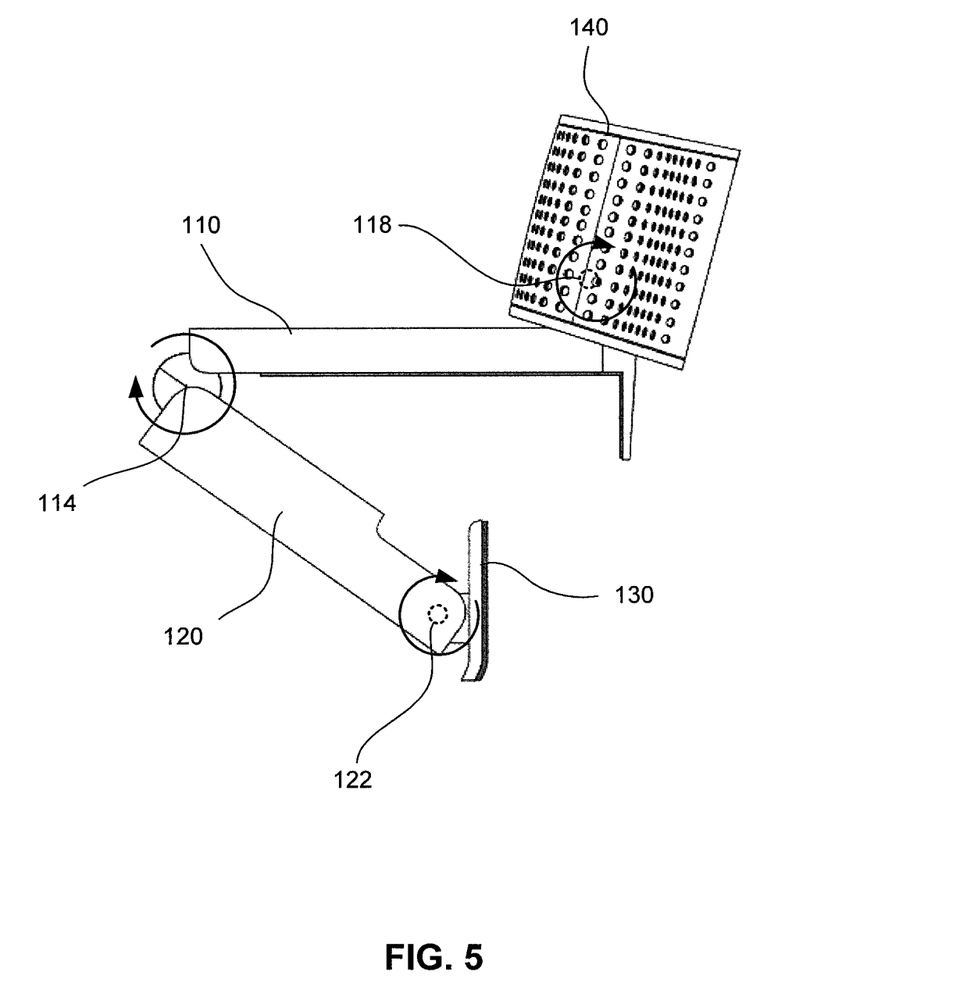
FIG. 5 is a side view showing the rotation of various linkages and a camera housing of an exemplary webcam according to aspects of the invention.

According to one embodiment, and as shown in FIGS. 1 and 5, an exemplary camera support may include three axial friction hinges 114, 118 and 122. As mentioned above, FIG. 1 shows the webcam 100 in a closed configuration. FIG. 5 shows the webcam 100 in an open configuration, with second linkage 120 rotated partially away from first linkage 110, and third linkage 130 rotated partially away from second linkage 120. The inventors have found that, in order for such a configuration to perform optimally, a high torque and functional precision of the hinge for the third linkage, in particular, is desired. In this regard, it has been found that a friction hinge at 122 helps to stiffen the entire system, and that a relatively high torque value is desirable for the hinge 122 connecting the second linkage 120 and the third linkage 130.

Figure 6:
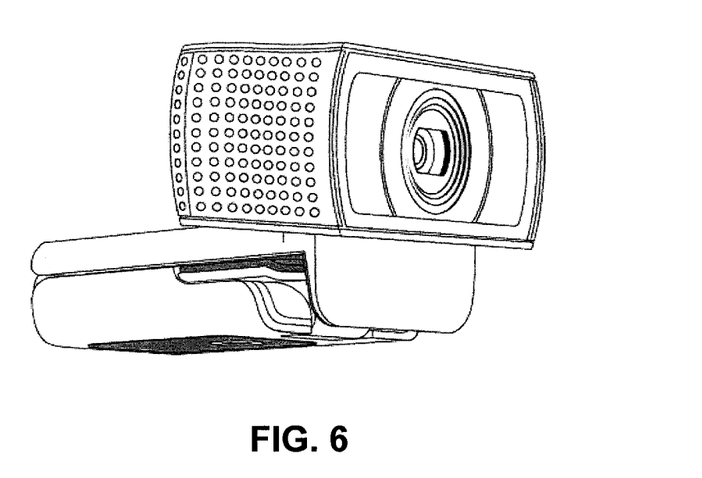
FIG. 6 is an isometric view of the webcam shown in FIG. 1 in a closed configuration.
Figure 7:
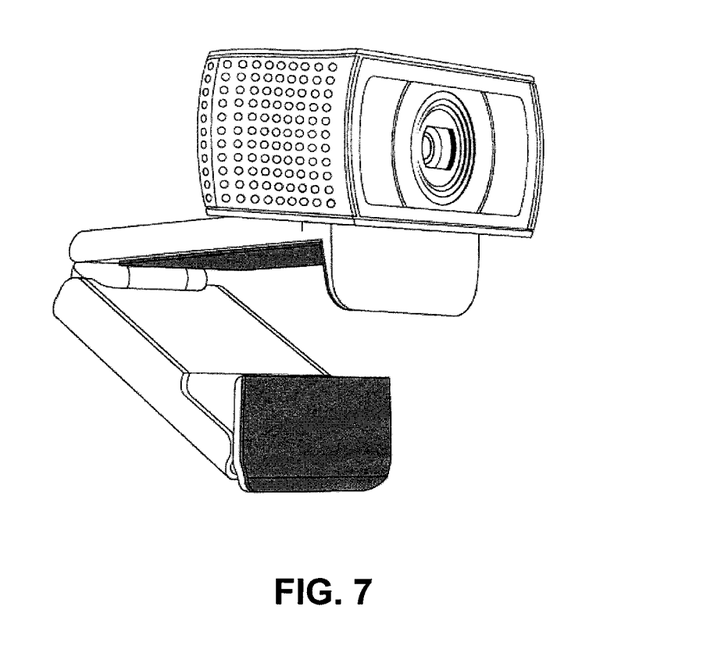
FIG. 7 is an isometric view of the webcam shown in FIG. 1 in an open configuration.

FIG. 5 also shows camera housing 140 rotated downward with respect to first linkage 110 about the axis of a hidden hinge 118. Hinge 118 is configured to allow camera housing 140 to tilt with respect to first linkage 110. For example, with first linkage 110 holding webcam 100 on a computer monitor, camera housing 140 may be tilted up or tilted down to move the field of view of the webcam. By providing a recessed or hidden hinge such as hinge 118, the relative position of a camera can be lowered with respect to the monitor, which may have several functional and aesthetic advantages, such as making the line of sight for the camera closer to screen, which can improve the overall feel of a video conference or chat. Isometric views are also provided in FIGS. 6 and 7 showing a closed and open configuration, respectively.

Figure 8:
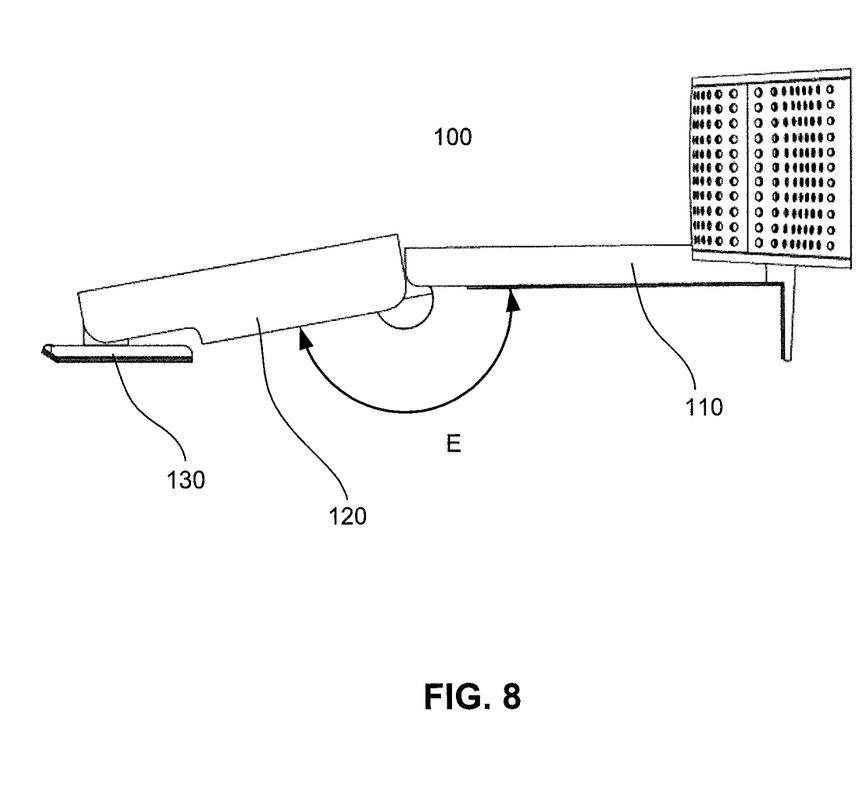
FIG. 8 is a side view of the webcam shown in FIG. 1 showing a range of motion of the second linkage.

FIG. 8 shows a possible range of motion E for the first linkage 110 and the second linkage 120 of an exemplary webcam 100. As shown in FIG. 8, the second linkage 120 may rotate in a range of approximately 170 degrees from a closed position, which may allow, for example, the webcam 100 to be placed on a surface (e.g., a flat desktop) so that the webcam may be used as a desktop webcam, or other sloped surface, such as the back of a CRT monitor. Other ranges are also possible, for example, the second linkage may be configured to rotate in excess of 90 degrees, in excess of 135 degrees, or in excess of 170 degrees.

Figure 9:
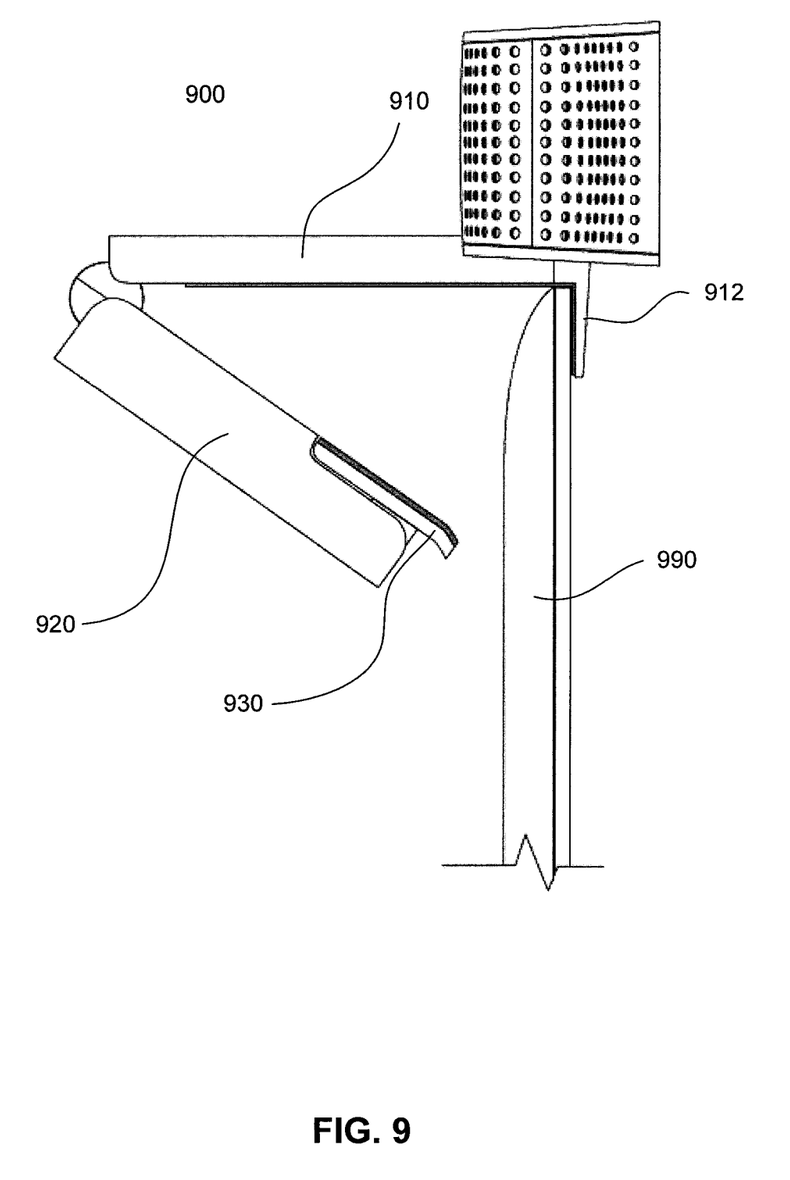
FIGS. 9-11 are side views of an exemplary camera mount in various stages of being applied to a thin panel display.

A preferred method of using a camera mount, or the like, including aspects of the invention is described with reference to FIGS. 9-11. As shown in FIG. 9, a camera mount 900 may be placed on a thin-panel display 990 by partially opening the second linkage 920 from the first linkage 910, and placing the lip 912 of the camera mount on the front surface of the display 990. Display 990 may have a thickness of, for example, 5 mm, or less. Significantly, at this point, the third linkage 930 is maintained in a closed position with respect to the second linkage 920.

Figure 10:
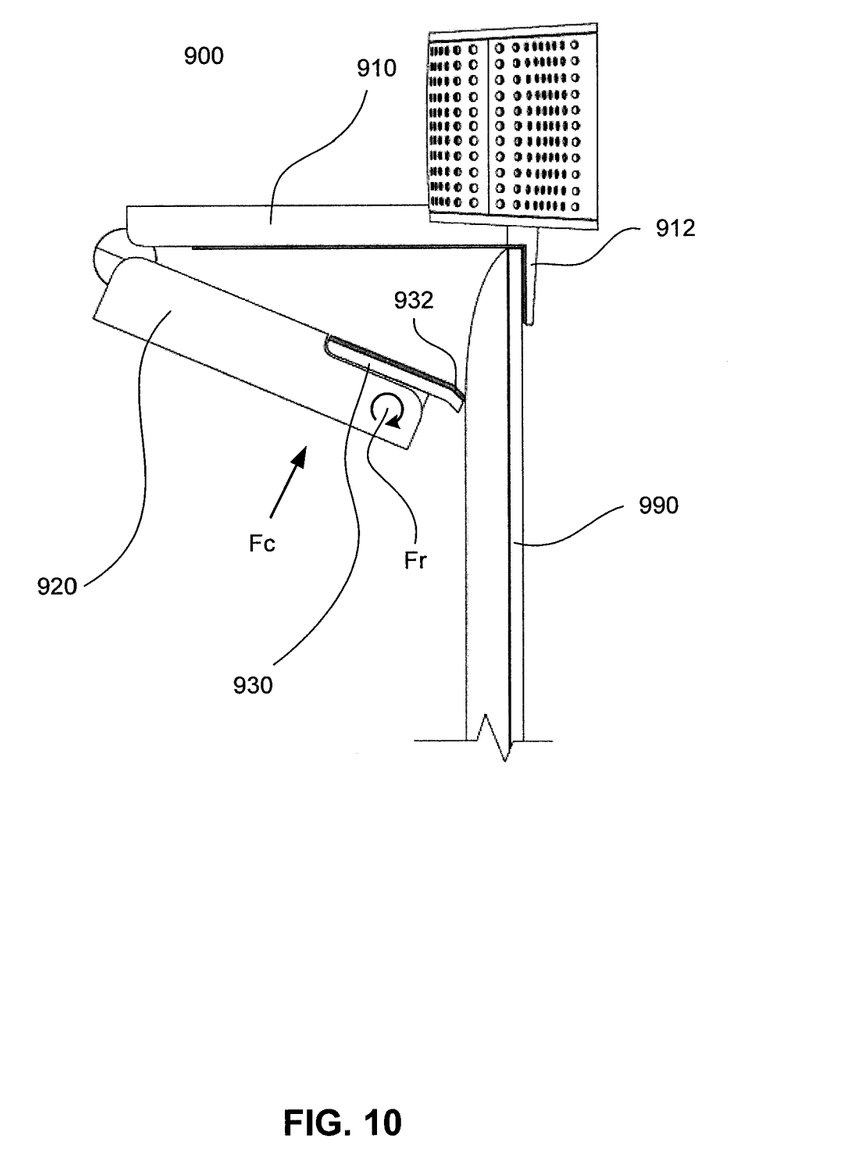

As shown in FIG. 10, a closing force Fc may be applied by a user to the bottom side of the second linkage 920, thereby closing the second linkage 920 toward the first linkage 910. The chamfered leading edge 932 of the third linkage 930 will then come into contact with the back surface of the display 990. According to aspects of the inventions, the inventors have found that providing a chamfer on the leading edge of the third linkage, and the like, significantly increases the amount of rotational force Fr applied to the third linkage, particularly when applied to thin displays, e.g. less than 5 mm thick. One reason for this is that, when working with thin displays, a straight leading edge on the third linkage can result in an undesirable amount of the force generated by pressing the second linkage upward being directed back toward the trailing edge of the linkage, resulting in a counter-revolutionary force. By beveling the leading edge 932, the moment contributing to Fr is increased, while the counter-revolutionary force is reduced, resulting in an easier self-activation of the third linkage.

Figure 11:
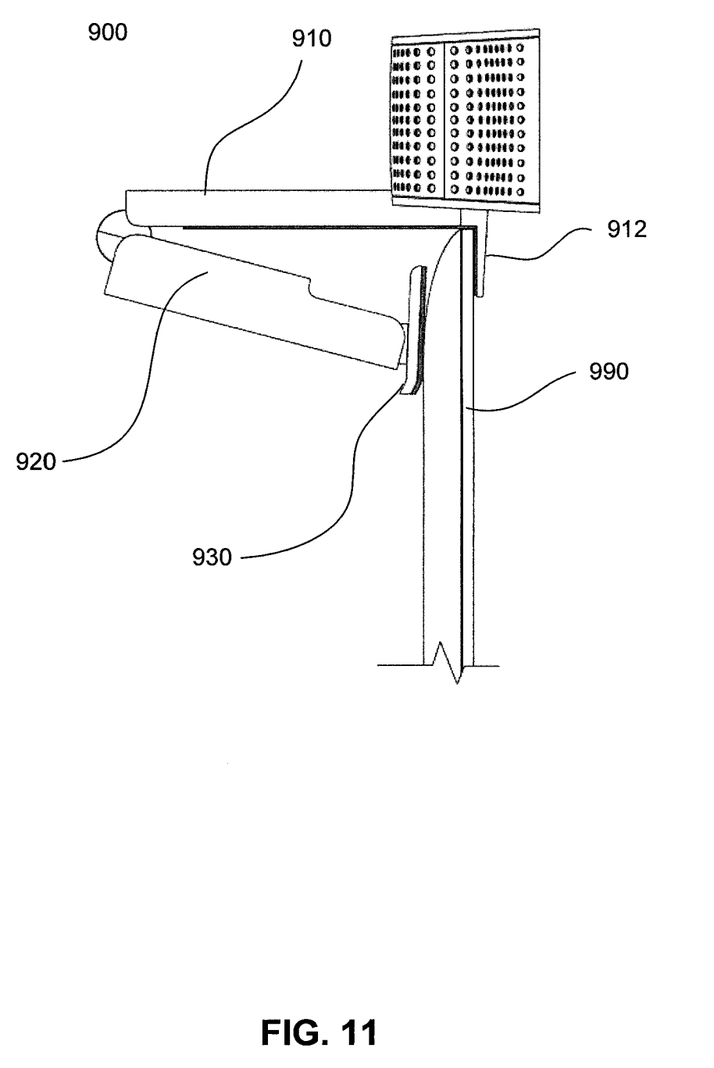

FIG. 11, shows the camera mount 900 secured to the display 990 with the third linkage 930 rotated to an open position in which a significant portion of the upper surface of the third linkage is in areal contact with the back of the display. The inventors have found that, in such a configuration, camera mounts according to aspects of the invention can maintain a relatively high stability compared to other known devices, even when the center of gravity of the attached camera is moved over a forward portion of the camera mount.

Additional methods of attaching camera mounts or the like including steps related to features otherwise described herein may also be included, as will be appreciated by those of skill in the art upon further understating of the present disclosure.

According to further aspects of the invention, a method of manufacturing a device mount, such as a camera mount, may include one or more steps of providing a first linkage including a body, an abutment piece approximately perpendicular to the body, and a device attachment mechanism disposed proximate to the abutment piece; providing a second linkage rotatably connected via a friction hinge to the first linkage; providing a third linkage rotatably connected via a friction hinge to the second linkage; and/or providing a leading edge of the third linkage with a chamfered edge. In embodiments, the third linkage may be disposed at least partially overlaping the second linkage and extending beyond an end of the second linkage.

According to embodiments, the upper surface of the third linkage may be coated by an overmold, preferably covering the entire upper surface and chamfered edge. Preferably, coated upper surface may be substantially flat, and has been found to provide a secure contact with a display monitor regardless of its rear profile design, compared to other geometries. Overmolds and the like can be done with various materials known in the art, that provide a relatively high coefficient of friction.

Additional methods of manufacturing device mounts including steps for providing features otherwise described herein may also be included, as will be appreciated by those of skill in the art upon further understating of the present disclosure.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. A device mount comprising:
   a first linkage including a body, an abutment piece at a forward end of the body and extending in a downward direction approximately perpendicular to the body, and a device attachment mechanism disposed proximate to said abutment piece and extending in an upward direction approximately perpendicular to the body;
   a second linkage rotatably connected to the first linkage at a rearward end of the body opposite to said abutment piece; and
   a third linkage having distal ends and rotatably connected to the second linkage at an end of the second linkage opposite to said rotating connection to said first linkage;
   wherein, the rotating connection of said third linkage is at a distance from both distal ends of said third linkage, such that in a first position said third linkage at least partially overlaps said second linkage and extends beyond an end of said second linkage, and
   wherein, the device attachment mechanism is disposed forward of the rotating connection of said third linkage.

2. The device mount of claim 1, wherein:
   said second linkage is rotatably connected to said first linkage via a friction hinge; and
   said third linkage is rotatably connected to said second linkage via another friction hinge.

3. The device mount of claim 1, wherein:
   said third linkage is rotatably connected to said second linkage via a friction hinge, and
   said third linkage includes a substantially planar contact surface.

4. The device mount of claim 3, wherein said third linkage includes a chamfered leading edge.

5. The device mount of claim 4, wherein:
   said third linkage includes a trailing edge opposite said leading edge;
   said friction hinge has an axis of rotation substantially parallel to said leading edge; and
   said leading edge is closer to the axis of rotation than said trailing edge.

6. The device mount of claim 1, wherein said device attachment mechanism includes an axial hinge disposed approximately above said abutment piece.

7. The device mount of claim 1, wherein said device attachment mechanism includes a ball joint disposed approximately above said abutment piece.

8. The device mount of claim 1, further comprising a camera housing configured to hold therein a camera and including a housing attachment mechanism complimentary to said device attachment mechanism disposed within said housing, above a bottom surface of said housing, and forward of a rear surface of said housing.

9. The device mount of claim 8, wherein said housing attachment mechanism includes an axial hinge disposed approximately above said abutment piece.

10. The device mount of claim 8, wherein said housing attachment mechanism includes a socket joint disposed approximately above said abutment piece.

11. The device mount of claim 8, further comprising a camera disposed in said camera housing, wherein a center of gravity of the combined camera and camera housing is above or forward of said abutment piece.

12. The device mount of claim 8, further comprising a camera disposed in said camera housing, wherein a center of gravity of the combined camera and camera housing is forward of said abutment piece.

13. The device mount of claim 1, wherein said first linkage has an overall length of approximately 60-75 mm.

14. The device mount of claim 1, wherein said first linkage has an overall length of approximately 50-60 mm.

15. The device mount of claim 1, wherein said first linkage has an overall length of approximately 40-50 mm.

16. The device mount of claim 1, wherein said second linkage is configured to rotate in excess of 90 degrees.

17. The device mount of claim 1, wherein said second linkage is configured to rotate in excess of 135 degrees.

18. The device mount of claim 1, wherein said second linkage is configured to rotate in excess of 170 degrees.

19. The device mount of claim 1, wherein said second linkage includes a counterweight.

20. A method of manufacturing a device mount comprising:
    providing a first linkage including a body, an abutment piece approximately perpendicular to the body, and a device attachment mechanism disposed proximate to said abutment piece;
    providing a second linkage rotatably connected via a friction hinge to the first linkage;
    providing a third linkage rotatably connected via a friction hinge to the second linkage; and
    providing a leading edge of the third linkage with a chamfered edge,
    wherein, the attachment mechanism is disposed forward of the friction hinge connecting the third linkage and the second linkage, and the third linkage is disposed at least partially overlapping the second linkage and extending beyond an end of the second linkage.

21. A device mount comprising:
    a first linkage including a body, an abutment piece at a forward end of the body and extending substantially downward from the body, and a device connection mechanism extending substantially upward from the body;
    a second linkage rotatably connected to the first linkage via a first friction hinge; and
    a third linkage rotatably connected to the second linkage via a second friction hinge,
    wherein, the device mount is configured to be temporarily attached to a display by:
        partially opening the first linkage and the second linkage via the first friction hinge;
        placing the abutment piece in contact with a front surface of the display; and
        partially closing the first linkage and second linkage via the first friction hinge such that a chamfered leading edge of the third linkage contacts a back surface of the display, and forces a rotation of the third linkage about the second friction hinge from a closed position to an open position engaged with the back surface of the display, and wherein, the device connection mechanism is disposed forward of the second friction hinge.

\* \* \* \* \*